US011962148B2

(12) United States Patent
Kim

(10) Patent No.: US 11,962,148 B2
(45) Date of Patent: Apr. 16, 2024

(54) MULTIPURPOSE SMART SWITCHBOARD DEVICE AND SYSTEM, AND OPERATION METHOD THEREOF

(71) Applicant: Euntae Kim, Jeju-si (KR)

(72) Inventor: Euntae Kim, Jeju-si (KR)

( * ) Notice: Subject to any disclaimer, the term of this patent is extended or adjusted under 35 U.S.C. 154(b) by 533 days.

(21) Appl. No.: 17/292,008

(22) PCT Filed: Dec. 27, 2018

(86) PCT No.: PCT/KR2018/016733
§ 371 (c)(1),
(2) Date: May 7, 2021

(87) PCT Pub. No.: WO2020/105793
PCT Pub. Date: May 28, 2020

(65) Prior Publication Data
US 2022/0006320 A1    Jan. 6, 2022

(30) Foreign Application Priority Data
Nov. 20, 2018  (KR) .................. 10-2018-0143096

(51) Int. Cl.
*H02J 13/00*     (2006.01)
*G16Y 20/30*     (2020.01)
*G16Y 40/10*     (2020.01)

(52) U.S. Cl.
CPC ........ *H02J 13/00002* (2020.01); *G16Y 20/30* (2020.01); *G16Y 40/10* (2020.01); *H02J 13/00007* (2020.01)

(58) Field of Classification Search
CPC ........... H02J 13/00002; H02J 13/00007; H02J 2310/60; H02J 2310/62; G16Y 20/30; G16Y 40/10; Y02E 60/00; Y04S 40/121
See application file for complete search history.

(56) References Cited

FOREIGN PATENT DOCUMENTS

| KR | 10-1255008 B1 | 4/2013 |
| KR | 10-1435328 B1 | 8/2014 |
| KR | 10-2015-0010312 A | 1/2015 |
| KR | 10-2015-0138765 A | 12/2015 |
| KR | 10-2017-0136816 A | 12/2017 |

OTHER PUBLICATIONS

Translation KR 10-2015-0010312 A (Year: 2015).*
Translation KR 10-1255008 B1 (Year: 2013).*
International Search Report for PCT/KR2018/016733 dated Aug. 16, 2019 from Korean Intellectual Property Office.

* cited by examiner

*Primary Examiner* — Tejal Gami
(74) *Attorney, Agent, or Firm* — Revolution IP, PLLC

(57) ABSTRACT

Disclosed in the present invention are a multipurpose smart switchboard device and system, and an operation method thereof, the multipurpose smart switchboard device and system including: a lead-in wire for supplying power to a customer; a main breaker connected to the lead-in wire; a first relay device connected between the main breaker and a first load using a regular power source; a second relay device connected to the first relay device; a third relay device connected to the second relay device; a fourth relay device connected between the third relay device and a second load including a general power consumption device; and a fifth relay device connected between the third relay device and a third load including a temperature regulation device.

10 Claims, 3 Drawing Sheets

[FIG. 1]
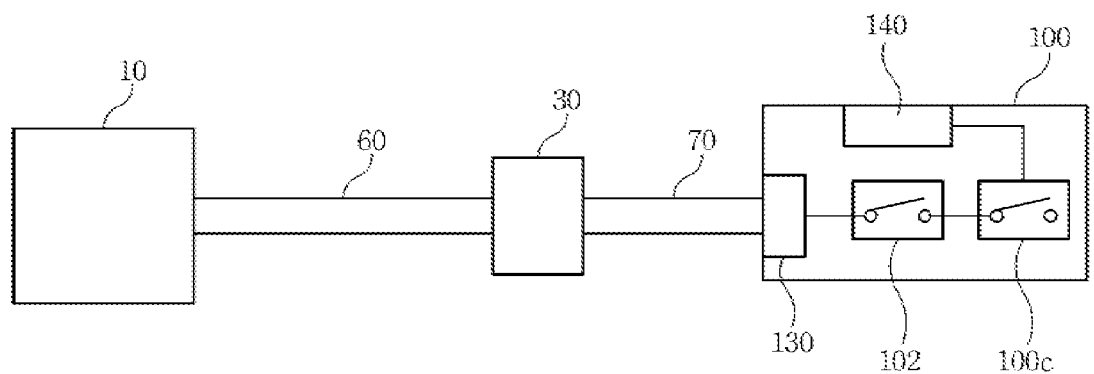

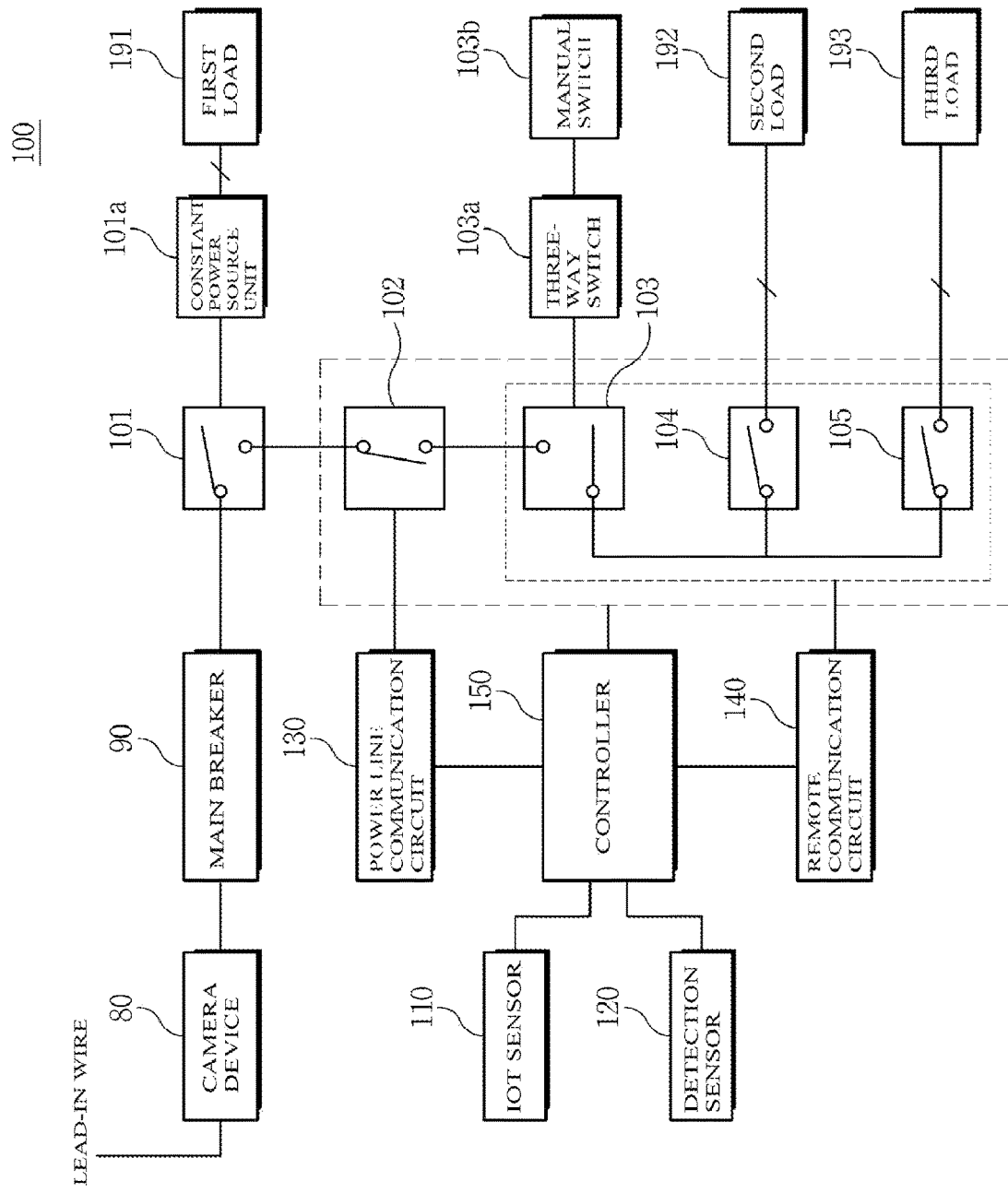
[FIG. 2]

[FIG. 3]
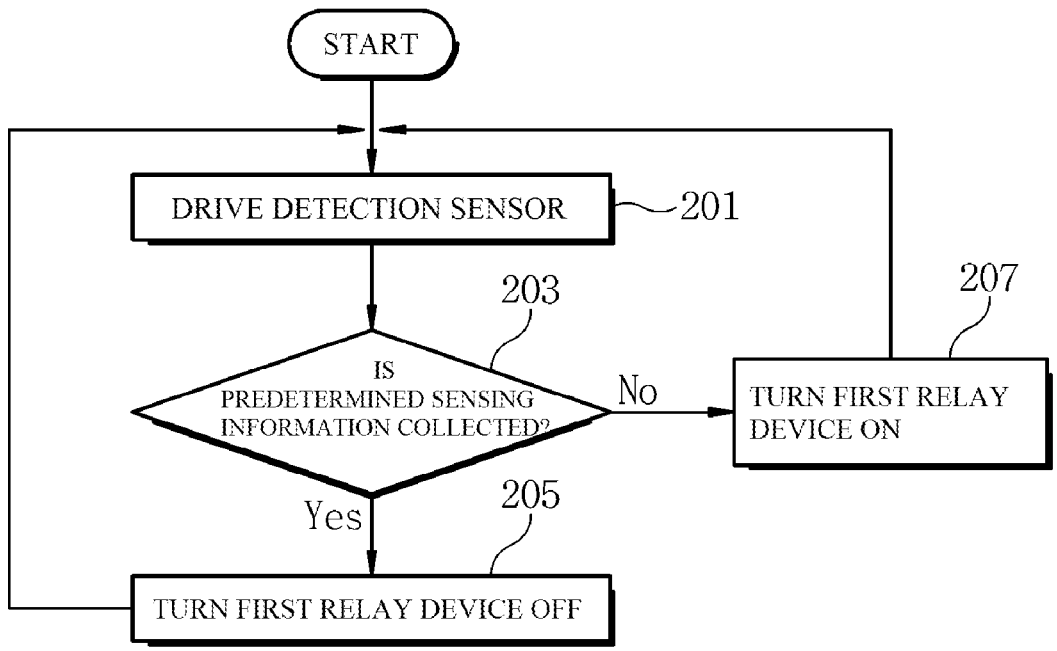

MULTIPURPOSE SMART SWITCHBOARD DEVICE AND SYSTEM, AND OPERATION METHOD THEREOF

TECHNICAL FIELD

The present invention relates to a switchboard device, and more specifically, to a multipurpose smart switchboard device and a multipurpose smart switchboard system for adaptively controlling power supply according to an operating environment, and an operation method thereof.

BACKGROUND ART

The conventional switchboard devices have been designed to be disposed at predetermined positions in houses to distribute power provided from a power plant to supply the power to electronic devices in houses, buildings, or the like. Meanwhile, since the conventional switchboard device serves to simply distribute power to be supplied to the house, the building, or the like, there is a problem in that a power saving function, a power demand management function, and the like are not provided, and thus a blackout cannot be prevented. Recently, as the use of electricity is rapidly increasing and electronic devices which are operated based on electricity are increasing, electricity saving and power demand management are becoming a necessity, not a demand.

In terms of electricity saving, research is being conducted in various ways on a method of reducing standby power in recent years. Standby power refers to power which is consumed when a power consumption device is connected to a power source without actually providing a user function. In order to reduce such standby power, users should directly separate the power consumption device from the power source or should block the power being supplied to each of the power consumption devices. Therefore, even when the users have willingness to save the power, there is a problem in that it is not easy to achieve electricity saving because the power consumption devices for reducing standby power consumption should be directly and repeatedly operated. Further, recently, there is a great deal of difficulty in preventing a blackout such as power demand management due to a surge in power demand in summer and winter and in disaster situations such as earthquakes.

DISCLOSURE

Technical Problem

The present invention is directed to providing a multipurpose smart switchboard device and a multipurpose smart switchboard system, in which standby power of power consumption devices is adaptively blocked according to a power operation environment to make electricity saving efficient and easy and a relay device that will be controlled and recovered according to commands of an energy management system (EMS) for power demand management and blackout prevention in a surge in power demand in summer and winter and in disaster situations such as earthquakes is provided, and an operation method thereof.

The present invention is also directed to providing a multipurpose smart switchboard device and a multipurpose smart switchboard system, in which power operation is adaptively and efficiently performed according to various situations occurring in a user's living environment, and an operation method thereof.

The present invention is also directed to providing a multipurpose smart switchboard device and a multipurpose smart switchboard system, in which a power operation environment is remotely or manually controlled, and an operation method thereof.

However, objects of the present invention are not limited to the above-described objects and other unmentioned objects may be clearly understood from the following descriptions.

Technical Solution

One aspect of the present invention provides a multipurpose smart switchboard device including a lead-in wire configured to supply power to a consumer house, a main breaker connected to the lead-in wire, a first relay device connected between the main breaker and a first load which uses a constant power source, a second relay device connected to the first relay device, a third relay device connected to the second relay device, a fourth relay device connected between the third relay device and a second load including a general power consumption device, and a fifth relay device connected between the third relay device and a third load including a temperature regulation device.

The multipurpose smart switchboard device may further include at least one of a three-way switch and a manual switch, which is connected to and manually controls the third relay device. Here, the manual switch may be installed at a position adjacent to a front door.

The multipurpose smart switchboard device may further include an Internet of Things (IoT) sensor which is connected to at least one of the third relay device, the fourth relay device, and the fifth relay device and collects standby power usage information according to power operation.

In addition, the multipurpose smart switchboard device may further include a detection sensor configured to detect whether at least one of heat, smoke, and gas having a value greater than or equal to a predetermined reference value is generated, wherein, when the detection sensor collects sensor signals greater than or equal to a predetermined reference value, the main breaker or the first relay device may become a turned-off state.

Here, after sensor signals greater than or equal to a predetermined reference value are collected, when sensor signals less than the predetermined reference value are collected, the main breaker or the first relay device may be transitioned from the turned-off state to a turned-on state.

In addition, the multipurpose smart switchboard device may further include a camera device which is connected to be parallel to the main breaker with respect to the lead-in wire in and is disposed to capture an image independently of a state in which the main breaker is turned off or turned on.

Alternatively, the multipurpose smart switchboard device may further include a power line communication circuit connected to the second relay device, wherein a turned-on state or a turned-off state of the second relay device may be controlled under the control of a power system operating institution connected through the power line communication circuit.

The multipurpose smart switchboard device may further include a remote communication circuit connected to at least one of the third relay device, the fourth relay device, and the fifth relay device, wherein the at least one of the third relay device, the fourth relay device, and the fifth relay device may become a turned-on state or a turned-off state under the control of a user terminal connected through the remote communication circuit.

Another aspect of the present invention provides a multipurpose smart switchboard system including a main breaker connected to a lead-in wire, a first relay device connected between the main breaker and a load for a constant power source, a second relay device connected between the first relay device and a power line communication circuit, a third relay device connected between the second relay device and a remote communication circuit, a fourth relay device connected between the third relay device and a second load including a general power consumption device, a fifth relay device connected between the third relay device and a third load including a temperature regulation device, and a power system operating institution from which power is supplied to the multipurpose smart switchboard device through the lead-in wire, wherein the power system operating institution communicates with the multipurpose smart switchboard device through a power line communication circuit and controls power operation by controlling the second relay device.

Still another aspect of the present invention provides an operation method of a multipurpose smart switchboard device including a main breaker connected to a lead-in wire, a first relay device connected between the main breaker and a load for a constant power source, a second relay device connected between the first relay device and a power line communication circuit, a third relay device connected between the second relay device and a remote communication circuit, a fourth relay device connected between the third relay device and a second load including a general power consumption device, a fifth relay device connected between the third relay device and a third load including a temperature regulation device, and a power system operating institution from which power is supplied to the multipurpose smart switchboard device through the lead-in wire, wherein the operation method includes detecting whether at least one of heat, smoke, and gas having a value greater than or equal to a predetermined reference value is generated, when it is detected that the at least one of heat, smoke, and gas having the value greater than or equal to the predetermined reference value is generated, turning the first relay device off, and when the generated at least one of heat, smoke, and gas having the value greater than or equal to the predetermined reference value is eliminated, turning the first relay device on.

In addition, the operation method may further include detecting whether a user is in at least one state of going out, returning, and sleeping, and changing a state of at least one of the third relay device, the fourth relay device, and the fifth relay device to a turned-on state or a turned-off state according to the at least one state of going out, returning, and sleeping of the user.

Advantageous Effects

According to a multipurpose smart switchboard device, a multipurpose smart switchboard system, and an operation method thereof of the present invention, sensor information about a surrounding environment for power operation can be collected and, power use can be efficiently achieved based on the sensor information.

Further, according to the present invention, power consumption devices can be grouped, and particularly, the power consumption devices can be grouped according to characteristics of standby power, thereby supporting efficient standby power management.

Further, according to the present invention, a power operation environment can be controlled regardless of a location or time, thereby providing an efficient and easy power operation method such as standby power interruption and power demand management.

In addition, various effects other than the above-described effects can be directly or implicitly disclosed in the detailed description according to embodiments of the present invention to be described below.

DESCRIPTION OF DRAWINGS

FIG. 1 is a diagram illustrating an example of a configuration of a multipurpose smart switchboard system according to an embodiment of the present invention.

FIG. 2 is a diagram illustrating an example of a consumer house in which a multipurpose smart switchboard device is disposed according to an embodiment of the present invention.

FIG. 3 is a diagram illustrating an example of an operation method of a multipurpose smart switchboard device according to an embodiment of the present invention.

MODES OF THE INVENTION

In order to clarify the features and advantages of the solutions of the present invention, the present invention will be described in more detail with reference to specific embodiments of the present invention illustrated in the accompanying drawings.

However, detailed descriptions of well-known functions or configurations that unnecessarily obscure the gist of the present invention in the following explanations and accompanying drawings will be omitted. The same reference numbers will be used throughout this specification to refer to the same or like parts.

Terms and words used in following description and drawings should not be interpreted as being limited to commonly used meanings or meanings in dictionaries and should be interpreted with meanings and concepts which are consistent with the technological scope of the present invention based on the principle that the inventors have appropriately defined concepts of terms in order to describe the present invention in the best way. Therefore, since the embodiments described in this specification and configurations illustrated in the drawings are only exemplary embodiments and do not represent the overall technological scope of the present invention, it is understood that the present invention covers various equivalents, modifications, and substitutions at the time of filing of this application.

Further, it will be understood that, although the terms first, second, etc. may be used herein to describe various elements, these elements should not be limited by these terms. These terms are used only to distinguish one element from another element. For example, a first element could be termed a second element, and similarly, a second element could be termed a first element without departing from the scope of the present invention.

It will be understood that the terminology used herein is for the purpose of describing particular embodiments only and is not intended to be limiting to the present invention. As used herein, the singular forms "a" and "an" are intended to include the plural forms as well, unless the context clearly indicates otherwise. It will be further understood that the terms "comprise," "comprising," "include," and/or "including," when used herein, specify the presence of stated features, integers, steps, operations, elements, and/or components but do not preclude the presence or addition of one or more other features, integers, steps, operations, elements, components, and/or groups thereof.

Moreover, terms described in the specification such as "part," "unit," "device," and "module" refer to a unit of processing at least one function or operation and may be implemented as hardware or software or a combination thereof. In addition, in the context of describing the present invention (especially, in the context of the following claims), unless otherwise indicated herein or clearly contradicted by context, the terms "a or an," "one," and "the," and similar related words may be used in a sense that includes both the singular and the plural.

In addition to the above-described terms, specific terms used in the following description are provided to aid understanding of the present invention, and the use of these specific terms may be changed in other forms without departing from the technological scope of the present invention.

In addition, embodiments within the scope of the present invention include computer-readable media having or carrying computer-executable instructions or data structures stored in the computer-readable media. Such computer-readable media may be any available media accessible by a general purpose or special purpose computer system. For example, such computer-readable media may include a random access memory (RAM), a read only memory (ROM), an erasable programmable read only memory (EPROM), a compact disc read only memory (CD-ROM), an optical disk storage, a magnetic disk storage, or a magnetic storage, may be used to store or deliver computer-executable instructions, computer-readable instructions, or predetermined program code means in the form of data structures, and may include physical storage media such as any other media that can be accessed by a general purpose or special purpose computer system, but the present invention is not limited thereto.

FIG. 1 is a diagram illustrating an example of a configuration of a multipurpose smart switchboard system according to an embodiment of the present invention.

Referring to FIG. 1, a multipurpose smart switchboard system 1 according to the embodiment of the present invention may include a power system operating institution 10, a transformer 30, a transmission line 60, a lead-in wire 70, and a consumer house 100 in which at least some components included in a multipurpose smart switchboard device are disposed. The multipurpose smart switchboard system 1 of the present invention including the above-described components may support prevention of fire caused by heat, smoke, gas, etc. in a smart (house) switchboard using a detection sensor and data collection according to power use, may include a multi-channel module such as a high-power device (220 V/15 A, 20 A, 40 A, 50 A to 200 A, etc.) for remote control, and may support various functions, such as standby power interruption, power demand management, fire detection, and the like, of power consumption devices (or loads).

The power system operating institution 10 may produce power or purchase power from a power supplier and then supply the power to the consumer house 100. The power system operating institution 10 may be connected to the transformer 30 through the transmission line 60 to provide high-voltage power to the transformer 30. The power system operating institution 10 may form a communication channel with a power line communication circuit 130 disposed in the consumer house 100 through the lead-in wire 70 which is disposed between the transformer 30 and the consumer house 100. The power system operating institution 10 may form a communication channel with the power line communication circuit 130 on the basis of the transmission line 60 and the lead-in wire 70 and control the power being supplied to the consumer house 100. The power system operating institution 10 may include a power plant, a power exchange, or the like.

The transformer 30 may transform the high-voltage power supplied from the power system operating institution 10 and transmit the transformed power to the consumer house 100 through the lead-in wire 70.

The transmission line 60 may connect the power system operating institution 10 to the transformer 30, and the high-voltage power of the power system operating institution 10 may be transmitted to the transformer 30 through the transmission line 60. The transmission line 60 together with the lead-in wire 70 may serve as a communication line for supporting power line communication of the consumer house 100.

The lead-in wire 70 may be disposed between the transformer 30 and the consumer house 100. Alternatively, the lead-in wire 70 may be disposed between the transformer 30 and the multipurpose smart switchboard device disposed in the consumer house 100, and the power transformed by the transformer 30 may be transmitted to the multipurpose smart switchboard device through the lead-in wire 70. The lead-in wire 70 may be connected to the power line communication circuit 130 disposed in the consumer house 100 and may be used as a portion of a communication line with the power system operating institution 10.

The consumer house 100 may correspond to a consumer house at which a customer purchases electricity for the purpose of using electricity and which may be one of various subjects receiving electricity, such as houses, industries, medical facilities, and the like. In the present invention, as an example of the consumer house 100, a house will be described. However, the present invention is not limited thereto. The consumer house 100 may include the multipurpose smart switchboard device, and at least some components of the multipurpose smart switchboard device may include the power line communication circuit 130, a relay device 102, a remote communication circuit 140, and a relay device group 100c.

The power line communication circuit 130 may be connected to the lead-in wire 70 to support the formation of a communication channel based on a power line. For example, the power line communication circuit 130 may form a communication channel between the power system operating institution 10 and the consumer house 100 on the basis of the lead-in wire 70 and the transmission line 60 and control power to be supplied to various loads disposed in the consumer house 100 according to a power control policy of the power system operating institution 10. In this regard, the power line communication circuit 130 may be connected to the relay device 102 that supplies power to the consumer house 100. The power system operating institution 10 may control the relay device 102 through the power line communication circuit 130 to control power to be supplied to another relay device connected to the relay device 102 or to at least one load connected to the relay device 102.

The relay device 102 may be connected to the power line communication circuit 130 and may be in a turned-on state or a turned-off state according to a control signal received by the power line communication circuit 130. The relay device 102 may be electrically connected to the lead-in wire 70 and may transmit the power transmitted through the lead-in wire 70 to at least one load included in the consumer house 100. Alternatively, as illustrated in the drawing, the relay device 102 may be connected to the relay device group 100c connected to other loads and may control power to be supplied to the relay device group 100c.

The remote communication circuit 140 may transmit or receive the communication signal remotely. For example, the remote communication circuit 140 may support various types of remote communication such as third-generation (3G) mobile communication, fourth-generation (4G) mobile communication, Internet communication, and the like. Alternatively, the remote communication circuit 140 may be connected to a mobile communication terminal of the user based on a base station. Meanwhile, the remote communication circuit 140 may be connected to the relay device group 100c. Accordingly, when the remote communication circuit 140 receives a control signal for requesting control of the relay device group 100c from the user terminal connected thereto, the remote communication circuit 140 may control turning-on or turning-off of the relay device group 100c.

The relay device group 100c may be connected to at least one load. In this regard, the relay device group 100c may include a plurality of relay devices. When the relay device group 100c becomes a turned-off state, the power being supplied to at least one load may be blocked so that standby power consumption may be eliminated. Alternatively, the relay device group 100c may be connected to the remote communication circuit 140 and may become a turned-on state to supply the power to a specific load under the control of the user terminal. In addition, the multipurpose smart switchboard device may include a controller, and the controller may control the operation of the power line communication circuit 130, the relay device 102, the remote communication circuit 140, and the relay device group 100c.

FIG. 2 is a diagram illustrating an example of a consumer house in which a multipurpose smart switchboard device is disposed according to an embodiment of the present invention.

Referring to FIG. 2, a consumer house 100 according to the embodiment of the present invention may include at least a portion of a lead-in wire 70, a camera device 80, a main breaker 90, a first relay device 101 connected to the main breaker 90, a constant power source unit 101a, and a first load 191. Further, the consumer house 100 may include an Internet of Things (IoT) sensor 110, a detection sensor 120, a power line communication circuit 130, a remote communication circuit 140, a controller 150, a second relay device 102, a third relay device 103, a fourth relay device 104, a fifth relay device 105, a three-way switch 103a, a manual switch 103b, a second load 192, and a third load 193. Here, the multipurpose smart switchboard device of the present invention may be designed as including at least some components included in the consumer house 100. For example, the multipurpose smart switchboard device may include the controller 150, the first to fifth relay devices 101, 102, 103, 104, and 105, and the main breaker 90. In addition, the multipurpose smart switchboard device may further include at least one of the camera device 80, the power line communication circuit 130, and the remote communication circuit 140. As another example, the multipurpose smart switchboard device of the present invention may be equipped with five relay devices, a three-way switch, and a manual switch and may include a multi-channel module system for distributing high power (220 V/15 A, 40 A, 50 A or more) for remote control. Meanwhile, in the above description, the multipurpose smart switchboard device is described as including the controller 150 but, in the present invention, the controller 150 may become at least one of the relay devices, or at least one of communication circuits may include a processor and perform a control function. In this regard, the relay device may further include a processor, a memory, and the like for a control function in addition to a structure having a relay function. Similarly, the power line communication circuit or the remote communication circuit may further include a processor, a memory, and the like for a control function in addition to a communication function.

The camera device 80 may be connected to be parallel to the main breaker 90 with respect to the lead-in wire 70. Accordingly, the camera device 80 may continuously capture an image even when the power being supplied to the consumer house 100 is blocked by the main breaker 90. For example, the camera device 80 may capture an image even when the main breaker 90 is turned off (i.e., the power being supplied to the house is blocked) due to an overload of the breaker, electric fire, or the like. The camera device 80 may be attached to an upper end of the main breaker 90. The camera device 80 may further include a memory for storing the captured image, and a communication circuit for transmitting the stored image to a designated device. For example, the camera device 80 may include a remote communication and power line communication module and may transmit the captured image to a fire department or a designated server.

The main breaker 90 is a component which is first connected to the lead-in wire 70 connected to the consumer house 100 and may be disposed to block the power being supplied to the consumer house 100 through the lead-in wire 70 depending on a predetermined condition. For example, when fire occurs in the consumer house 100 or around the consumer house 100 or when an overload of a predetermined size or more occurs, the main breaker 90 may be turned off. In this regard, the main breaker 90 may include a separate detection sensor for detecting an outbreak of fire or the like, may receive sensor signals collected by the detection sensor 120, or may be turned on or turned off under the control of the controller 150.

The first relay device 101 may be connected between the main breaker 90 and the constant power source unit 101a. Further, the first relay device 101 may be connected to the second relay device 102. When heat, smoke, or gas, etc. having a size greater than or equal to a predetermined size is detected in the consumer house 100, the first relay device 101 may be turned off. In order to detect the surrounding environment, the first relay device 101 may have a separate detection sensor or may be connected to the detection sensor 120 to receive a sensor signal. The first relay device 101 may include a lamp, a display, a speaker, etc. to notify (or alarm) the user of the turned-off state or the turned-on state thereof. When heat, smoke, or gas, etc. having a size less than the predetermined size is detected by the detection sensor 120, the first relay device 101 may be turned on again to perform power supply. A speaker connected to the first relay device 101 may be disposed around the smart switchboard device (or a smart distribution box) or may be separately disposed in a designated place, such as a kitchen, a living room, a storehouse, or the like.

The constant power source unit 101a may be connected between the first relay device 101 and the first load 191. The constant power source unit 101a may always supply power to the first load 191 connected thereto.

The first load 191 may include a power consumption device which is connected to the constant power source unit 101a to continuously supply power. For example, the first load 191 may include an emergency light, a refrigerator, a rice cooker, etc. disposed in the consumer house 100. When the first relay device 101 is in a turned-off state, the power being supplied to the first load 191 may be blocked and the first relay device 101 may be turned off.

The IoT sensor 110 may collect standby power information of each of the relay devices or each of the power consumption devices. For example, when the second relay device 102, the third relay device 103, the fourth relay device 104, or the like is blocked, the IoT sensor 110 may collect information about an amount of the blocked standby power and provide the collected information about the amount of the power to the controller 150.

The detection sensor 120 may detect at least one of heat, smoke, and gas. The detection sensor 120 may be attached to an outside of a distribution box, a kitchen, a living room, a room, a storehouse, a corridor, or the like. The detection sensor 120 may periodically collect sensor signals, and when the collected sensor signals have a value greater than or equal to a preset reference value, the detection sensor 120 may transmit a signal corresponding thereto to the main breaker 90, the first relay device 101, or the like or may transmit the corresponding signal to the power line communication circuit 130 or the remote communication circuit 140 under the control of the controller 150. The detection sensor 120 may collect the sensor signals at regular periods after receiving the sensor signals having the value greater than or equal to the preset reference value and provide the collected sensor signals to the main breaker 90, the first relay device 101, the controller 150, or the like. Alternatively, the detection sensor 120 may collect the sensor signals having a value greater than or equal to a reference value and then transmit a signal according to a change in the surrounding environment to the main breaker 90, the first relay device 101, the controller 150, or the like by collecting sensor signals having a value less than the reference value.

The power line communication circuit 130 may be connected to the Internet (or an IoT network) in connection with control and recovery of the second relay device 102. For example, the power line communication circuit 130 may form a communication channel with the power system operating institution 10 and may become a turned-on state or a turned-off state in response to a request of the power system operating institution 10. When a user residing in the consumer house 100 goes out, the power line communication circuit 130 may turn the second relay device 102 off to block the power being supplied to the third relay device 103 or the like.

In the event of an emergency power supply and demand by the government (e.g., the power system operating institution 10), the second relay device 102 may be controlled according to a control signal transmitted from the power system operating institution 10 through the power line communication circuit 130. In this regard, the power system operating institution 10 may operate software for power demand management (or energy management system (EMS)). The EMS may be a system that collects and analyzes Korea Electric Power Corporation's house-to-house and regional power consumption data, stores households and buildings with high power consumption in 10 levels by ranking, and controls the power supply step by step when a power reserve rate reaches a set value in the event of an emergency power supply and may be a system that recovers the power supply in proportion to each step when power reserve rate increases. As described above, the second relay device 102 may be a device which is controlled through the power line communication circuit 130 according to a control signal of an external control system.

When the third relay device 103, the fourth relay device 104, and the fifth relay device 105 are controlled and recovered, the remote communication circuit 140 may form a communication channel that may be connected to the Internet (e.g., the IoT network). For example, the remote communication circuit 140 may form a communication channel with a user terminal and transmit a control signal transmitted from the user terminal to the third relay device 103, the fourth relay device 104, and the fifth relay device 105.

The third relay device 103 may include an application (APP) for controlling all breakers except for a breaker for the constant power source and include a structure for controlling the breakers. For example, the third relay device 103 may block or maintain the power being supplied to the second load 192 connected to the fourth relay device 104 and the power being supplied to the third load 193 connected to the fifth relay device 105. Accordingly, the third relay device 103 may be used to block standby power of the second load 192 and the third load 193. For example, when the user residing in the consumer house 100 goes out, the third relay device 103 may block the power supply, and when the user returns, the third relay device 103 may resume the power supply. In this regard, the third relay device 103 may receive a control signal related to the control of the turned-on state or the turned-off state from the user through the remote communication circuit 140 or may receive the control signal through the three-way switch 103*a* or the manual switch 103*b*.

The fourth relay device 104 may include an APP for controlling all breakers except for a breaker for the constant power source and a dedicated breaker for an air conditioner and a boiler system and include a structure for controlling the breakers. That is, the fourth relay device 104 may be connected to the second load 192 and may control the power to be supplied or not supplied to at least one power consumption device belonging to the second load 192. For example, when the user of the consumer house 100 is sleeping, the fourth relay device 104 may block the power being supplied to the second load 192. In this regard, the fourth relay device 104 may communicate with the user terminal through the remote communication circuit 140 and may become a turned-on state or a turned-off state under the control of the user terminal. When the user terminal determines that the user is sleeping, the user terminal may transmit a control signal for turning the fourth relay device 104 off to the fourth relay device 104 through the remote communication circuit 140. Further, when the user terminal determines that the user will wake up (e.g., when the wake-up time arrives), the user terminal may transmit a turned-on control signal to the fourth relay device 104 through the remote communication circuit 140 to control the designated power consumption device (e.g., the second load 192) to be turned on. As described above, the fourth relay device 104 may control the standby power to be not supplied to the second load 192 by controlling the power to be supplied or not supplied to the second load 192.

The fifth relay device 105 may include a standby power interruption APP for controlling a breaker for an air conditioner or a boiler system and include a structure for performing a function. When the air conditioner or the boiler system is not in use, the fifth relay device 105 may block the standby power being supplied to the air conditioner, the boiler system, or the like by blocking the power being supplied to the corresponding power consumption devices. For example, in a period from June to September, the fifth relay device 105 may block the power being supplied to the boiler system or may block or maintain the power supply according to the control signal transmitted from the user terminal through the remote communication circuit 140. Further, in a period from November to February, the fifth relay device 105 may block the power being supplied to the air conditioner or block or maintain the power supply according to the control signal transmitted from the user terminal through the remote communication circuit 140.

In addition, the consumer house 100 or the multipurpose smart switchboard device may further include a 3-channel remote control module or a 4-channel remote control module. For example, the 3-channel remote control module may form a communication channel with a terminal or a server designated for controlling a turned-on state or a turned-off state of the third relay device 103, the fourth relay device 104, and the fifth relay device 105. For example, the 3-channel remote control module may form a communication channel with the user terminal and transmit the control signal received from the user terminal to the relay devices. The 4-channel remote control module may form a communication channel with a terminal or a server designated for controlling a turned-on state or a turned-off state of the second relay device 102, the third relay device 103, the fourth relay device 104, and the fifth relay device 105. For example, the 4-channel remote control module may receive a control signal from the power system operating institution 10 or the user terminal and transmit the control signal to the related relay device.

The three-way switch 103a may be disposed between the third relay device 103 and the manual switch 103b (e.g., a front door switch) to support simultaneous control of the third relay device 103 and the manual switch 103b. The three-way switch 103a may be disposed in each of a plurality of places according to the purpose of the user residing in the consumer house 100. For example, the three-way switch 103a may be disposed inside the front door and at a position adjacent to a case of the multipurpose smart switchboard device. When the user goes out or leaves an office, the user may remotely or manually control the third relay device 103 using the three-way switch 103a, the APP, and the manual switch 103b.

The manual switch 103b may be disposed in a porch or the like to be used by children or the elderly. Before a child or the elderly enters the house, the manual switch 103b may be manipulated to resume the power to be supplied to the load in the consumer house 100, or before the child or the elderly goes out of the house, the manual switch 103b may be manipulated to block the power being supplied to the load in the consumer house 100.

The second load 192 may include various power consumption devices except for the power consumption device for a constant power source and a temperature regulation device, which are installed in the consumer house 100. For example, the second load 192 may include all breakers except for a breaker for the constant power source and the third load 193. At least one breaker may be disposed between the second load 192 and the fourth relay device 104, and the fourth relay device 104 may control the power to be supplied continuously or not supplied to the second load 192 by controlling the breaker.

The third load 193 may include a temperature regulation device of the consumer house 100. The temperature regulation device may include, for example, an air conditioner, a boiler system, or the like. At least one breaker may be disposed between the third load 193 and the fifth relay device 105, and the fifth relay device 105 may control the power to be supplied continuously or not supplied to the third load 193 by controlling the breaker.

The controller 150 may control at least one breaker or the relay devices disposed in the consumer house 100. For example, the controller 150 may control a turned-on state or a turned-off state of the second relay device 102 according to a control signal received from the power system operating institution 10 connected through the power line communication circuit 130. The controller 150 may control a turned-on state or a turned-off state of at least one of the third relay device 103, the fourth relay device 104, and the fifth relay device 105 according to a control signal received from the user terminal connected through the remote communication circuit 140. The controller 150 may control a turned-on state or a turned-off state of at least one of the main breaker 90 and the first relay device 101 to correspond to a value of at least one sensor signal detected through the detection sensor 120. Alternatively, the controller 150 may confirm the presence or absence of the user residing in the consumer house 100 or the user's activity state (e.g., cooking, sleeping, etc.) using the detection sensor 120 and control a turned-on state or a turned-off state of at least one relay device according to a result of the checking.

FIG. 3 is a diagram illustrating an example of an operation method of a multipurpose smart switchboard device according to an embodiment of the present invention.

Referring to FIG. 3, a controller 150 of the multipurpose smart switchboard device may drive a detection sensor 120 in operation 201. The detection sensor 120 may detect, for example, whether heat, smoke, gas, or the like having a value greater than or equal to a predetermined reference value is generated in a certain region. The detection sensor 120 may be disposed in a certain region (e.g., a kitchen, a storehouse, a corridor, etc.) of the consumer house 100 in which heat, smoke, or gas may be generated.

In operation 203, the controller 150 may check whether predetermined sensing information is collected. For example, when sensor signals having a value greater than or equal to a predetermined reference value are received, the detection sensor 120 may transmit information indicating the reception of the sensor signals to the controller 150.

When it is checked that the predetermined sensing information is collected, the controller 150 may turn the first relay device 101 off in operation 205. When the first relay device 101 becomes a turned-off state, power being supplied to the consumer house 100 may be blocked.

When it is checked that the predetermined sensing information is not collected, the controller 150 may turn the first relay device 101 on in operation 207. Alternatively, the controller 150 may maintain the turned-on state of the first relay device 101. Accordingly, the power may be continuously supplied to the consumer house 100.

In connection with the power operation described in FIG. 3 described above, the multipurpose smart switchboard device may include a controller 150, a first relay device 101, and a detection sensor 120.

As another example, the multipurpose smart switchboard device may include a power line communication circuit 130, a second relay device 102, a remote communication circuit 140, a third relay device 103, a fourth relay device 104 disposed between a second load 192 and the third relay device 103, and a fifth relay device 105 disposed between a third load 193 and the third relay device 103. The multipurpose smart switchboard device including the above components may communicate with a power system operating institution 10 through the power line communication circuit 130 and may control the power supply by controlling at least one relay device under the control of the power system operating institution 10. Alternatively, the multipurpose smart switchboard device may communicate with a user terminal through the remote communication circuit 140 and may control at least one relay device according to a control signal received from the user terminal.

As another example, the detection sensor 120 included in the multipurpose smart switchboard device may collect sensor signals through which a user's activity state may be analyzed, for example, sensor signals through which whether the user is in a sleeping state, a state of going out or going to work, a state living in the consumer house 100 after work, etc. may be distinguished. In this case, the multipurpose smart switchboard device may control a turned-on state or a turned-off state of at least one relay device according to the user's activity state and control the standby power of the power consumption devices (e.g., at least one of the first load 191, the second load 192, and the third load 193). For example, when the user goes out (e.g., when determined based on a detection sensor that detects entrance and exit of the front door), the controller 150 of the multipurpose smart switchboard device may turn the third relay device 103 off to block the standby power being supplied to the power consumption devices except for the constant power source. Alternatively, when the user returns, the controller 150 of the multipurpose smart switchboard device may turn the third relay device 103 on to resume the standby power to be supplied to the power consumption devices except for the constant power source. Alternatively, when the user is sleeping (e.g., when receiving information about the user's sleeping state from the user terminal through the remote communication circuit 140), the controller 150 of the multipurpose smart switchboard device may turn the fourth relay device 104 off and turn the fifth relay device 105 on to supply standby power or operating power only to the temperature regulation device.

As described above, while this specification includes details of a plurality of specific implementations, these should not be understood as limitations of any invention or the scope to be claimed but should be understood as descriptions of features that can be specific to specific embodiments of the specific invention.

Further, while the accompanying drawings illustrate operations in a particular order, this does not mean that these operations should be performed in the illustrated specific order or sequence or that all illustrated operations should be performed in order to obtain a desired result. In a particular case, multi-tasking and parallel processing may be advantageous. Separation of various system components in the above embodiment does not mean that such separation is required for all embodiments. In general, described program components and systems may be integrated in a single software product or may be packed in multiple software products.

The above descriptions provide a best mode of the present invention and provide examples to describe the present invention for those skilled in the art to manufacture and use the present invention. In this specification, the present invention is not limited to proposed specific terms. Therefore, while the present invention has been described in detail with reference to the above-described examples, it will be understood by those skilled in the art that various changes, modifications, and alterations may be made without departing from the spirit and scope of the present invention.

Therefore, the scope of the present invention is defined not by the described embodiments but by the scope of the appended claims.

INDUSTRIAL APPLICABILITY

According to a multipurpose smart switchboard device, a multipurpose smart switchboard system, and an operation method thereof of the present invention described above, the present invention partially controls operation of loads or standby power according to various environments or conditions related to a power operation of a consumer house or controls the power to be supplied to all loads, thereby supporting efficient and easy power use control such as power demand management and blackout prevention.

Accordingly, the present invention may support in reducing unnecessary power use by providing an optimal electricity usage environment even when the user's attention or interest is insufficient.

The invention claimed is:

1. A multipurpose smart switchboard device comprising:
   a lead-in wire configured to supply power to a consumer house;
   a camera device connected to the lead-in wire;
   a main breaker connected to the camera device;
   a first relay device connected between the main breaker and a first load which uses a constant power source;
   a second relay device which is connected to the first relay device and controls all breakers except for a breaker for the constant power source;
   a third relay device which is connected to the second relay device and controls all the breakers except for the breaker for the constant power source;
   a fourth relay device which is connected between the third relay device and a second load including a general power consumption device and controls all the breakers except for the breaker for the constant power source and a breaker for a temperature regulation device; and
   a fifth relay device which is connected between the third relay device and a third load including a temperature regulation device and controls the breaker for a temperature regulation device.

2. The multipurpose smart switchboard device of claim 1, further comprising at least one of a three-way switch, a manual switch, and an application (APP), which is connected to and manually controls the third relay device,
   wherein the at least one of a three-way switch, the manual switch, and the APP remotely or manually controls the third relay device, and
   the manual switch is installed at a position adjacent to a front door.

3. The multipurpose smart switchboard device of claim 1, further comprising an Internet of Things (IoT) sensor which is connected to at least one of the third relay device, the fourth relay device, and the fifth relay device and collects standby power usage information according to power operation.

4. The multipurpose smart switchboard device of claim 1, wherein the camera device is connected to be parallel to the main breaker with respect to the lead-in wire and is disposed to capture an image independently of a state in which the main breaker is turned off or turned on.

5. The multipurpose smart switchboard device of claim 1, further comprising a detection sensor configured to detect whether at least one of heat, smoke, and gas having a value greater than or equal to a predetermined reference value is generated,
   wherein, when the detection sensor collects sensor signals greater than or equal to a predetermined reference value, the main breaker or the first relay device becomes a turned-off state and, thereafter, when the detection sensor collects sensor signals less than the predetermined reference value, the main breaker or the first relay device is transitioned from the turned-off state to a turned-on state.

6. The multipurpose smart switchboard device of claim 1, further comprising a power line communication circuit connected to the second relay device,
wherein a turned-on state or a turned-off state of the second relay device is controlled according to a command of an energy management system (EMS) of a power system operating institution connected through the power line communication circuit.

7. The multipurpose smart switchboard device of claim 1, further comprising a remote communication circuit connected to at least one of the third relay device, the fourth relay device, and the fifth relay device,
wherein the at least one of the third relay device, the fourth relay device, and the fifth relay device becomes a turned-on state or a turned-off state under the control of a user terminal connected through the remote communication circuit.

8. A multipurpose smart switchboard system comprising:
a multipurpose smart switchboard device including a camera device connected to a lead-in wire, a main breaker connected to the camera device, a first relay device connected between the main breaker and a first load which uses a constant power source, a second relay device which is connected to the first relay device and controls all breakers except for a breaker for the constant power source, a third relay device which is connected to the second relay device and controls all the breakers except for the breaker for the constant power source, a fourth relay device which is connected between the third relay device and a second load including a general power consumption device and controls all the breakers except for the breaker for the constant power source and a breaker for a temperature regulation device, and a fifth relay device which is connected between the third relay device and a third load including a temperature regulation device and controls the breaker for a temperature regulation device; and
a power system operating institution from which power is supplied to the multipurpose smart switchboard device through the lead-in wire,
wherein the power system operating institution communicates with the multipurpose smart switchboard device through a power line communication circuit and controls a power operation of an energy management system (EMS) for power demand management or blackout prevention by controlling the second relay device.

9. An operation method of a multipurpose smart switchboard device including a camera device connected to a lead-in wire, a main breaker connected to the camera device, a first relay device connected between the main breaker and a first load which uses a constant power source, a second relay device which is connected to the first relay device and controls all breakers except for a breaker for the constant power source, a third relay device which is connected to the second relay device and controls all the breakers except for the breaker for the constant power source, a fourth relay device which is connected between the third relay device and a second load including a general power consumption device and controls all the breakers except for the breaker for the constant power source and a breaker for a temperature regulation device, and a fifth relay device which is connected between the third relay device and a third load including a temperature regulation device and controls the breaker for a temperature regulation device, the operation method comprising:
detecting whether at least one of heat, smoke, and gas having a value greater than or equal to a predetermined reference value is generated;
when it is detected that the at least one of heat, smoke, and gas having the value greater than or equal to the predetermined reference value is generated, turning the first relay device off; and
when the generated at least one of heat, smoke, and gas having the value greater than or equal to the predetermined reference value is eliminated, turning the first relay device on.

10. The operation method of claim 9, further comprising:
detecting whether a user is in at least one state of going out, returning, and sleeping; and
changing a state of at least one of the third relay device, the fourth relay device, and the fifth relay device to a turned-on state or a turned-off state according to the at least one state of going out, returning, and sleeping of the user.

\* \* \* \* \*